(12) United States Patent
Huang

(10) Patent No.: US 9,000,948 B2
(45) Date of Patent: Apr. 7, 2015

(54) TRAFFIC LAMP WITH COLOR FILTER

(71) Applicant: Hon Hai Precision Industry Co., Ltd., New Taipei (TW)

(72) Inventor: Yung-Lun Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 75 days.

(21) Appl. No.: 13/949,239

(22) Filed: Jul. 24, 2013

(65) Prior Publication Data
US 2014/0139357 A1 May 22, 2014

(30) Foreign Application Priority Data
Nov. 19, 2012 (TW) .............................. 101143166 A

(51) Int. Cl.
G08G 1/095 (2006.01)
G08G 1/00 (2006.01)
G02B 26/00 (2006.01)
G02B 5/20 (2006.01)

(52) U.S. Cl.
CPC *G08G 1/00* (2013.01); *G02B 5/201* (2013.01); *G02B 26/007* (2013.01)

(58) Field of Classification Search
USPC .......... 340/907, 691.1, 691.4, 815.4, 815.45, 340/815.65; 362/257, 362
See application file for complete search history.

(56) References Cited

U.S. PATENT DOCUMENTS

| | | | | |
|---|---|---|---|---|
| 5,844,638 A | * | 12/1998 | Ooi et al. | ....................... 362/308 |
| 7,767,481 B2 | * | 8/2010 | Kim et al. | ....................... 438/48 |
| 8,081,270 B2 | * | 12/2011 | Lazarev | ....................... 362/600 |

* cited by examiner

*Primary Examiner* — Thomas Mullen
(74) *Attorney, Agent, or Firm* — Novak Druce Connolly Bove + Quigg LLP

(57) ABSTRACT

A traffic lamp includes a white light source, three color adjusting units, a panel, a light absorbing unit and a light diffusion unit. Each color adjusting unit includes a reflector and a color filter. The three color adjusting units are rotatable relative to the light source such that a part of white light emitted from the light source is filtered to be blue and then reflected to project on the panel by one color adjusting unit, and another part of white light is filtered to be green and yellow and then reflected to project on the light absorbing unit by the other two color adjusting units.

19 Claims, 1 Drawing Sheet

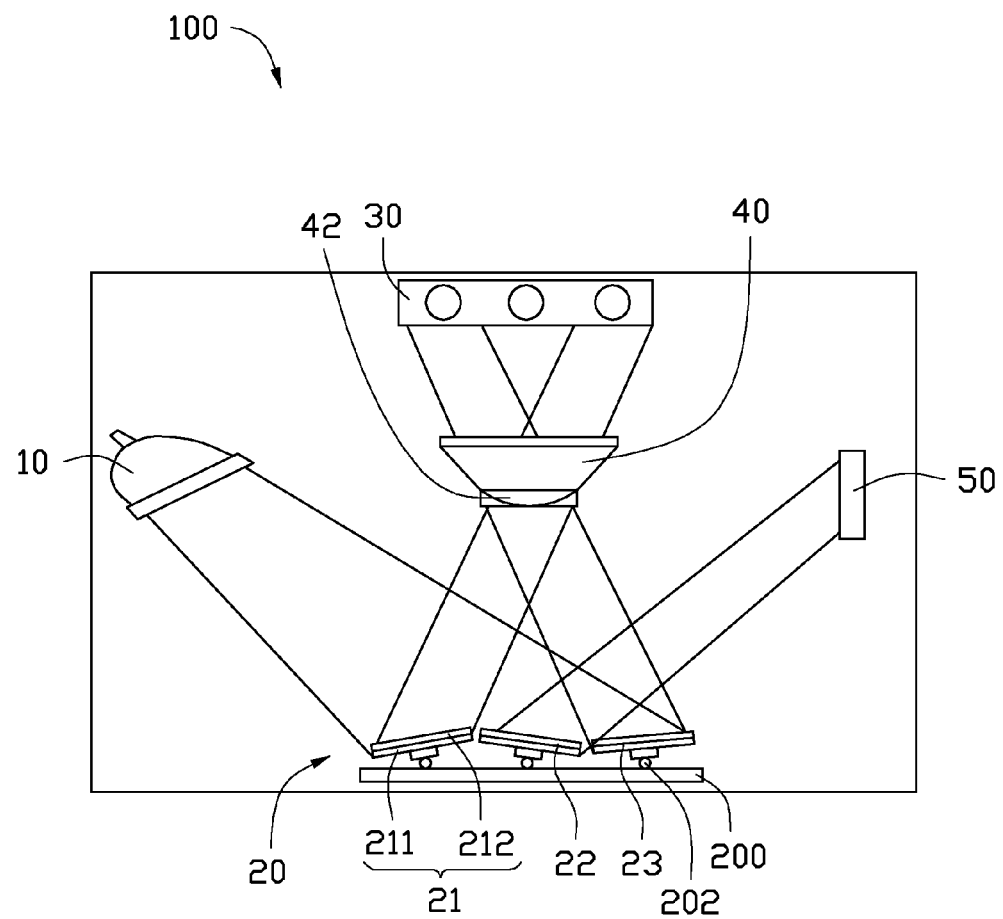

TRAFFIC LAMP WITH COLOR FILTER

BACKGROUND

1. Technical Field

The disclosure generally relates to traffic lamps, and more particularly, to a traffic lamp with color filters.

2. Description of Related Art

Nowadays LEDs (light emitting diodes) are applied widely in many occasions. A typical traffic lamp includes three light sources, i.e., a red light source, a green light source and a yellow light source. Each light source has a plurality of LEDs arranged in a matrix. In order to obtain sufficient intensity, the number of the LEDs of each light source is generally large (often exceeds 100). However, the large amount of LEDs require much energy to work, thereby resulting in high operation cost of the traffic lamp. Furthermore, the arrangement density of the large amount of LEDs of each light source is also high, whereby heat dissipation problems may arise accordingly.

What is needed, therefore, is a traffic lamp with color filters which can address the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the various views.

The only drawing figure schematically shows a traffic lamp in accordance with an embodiment of the present disclosure.

DETAILED DESCRIPTION

Referring to the figure, a traffic lamp 100 in accordance with an embodiment of the present disclosure is shown. The traffic lamp 100 includes a light source 10, three color adjusting units 20, a panel 30, a light diffusion unit 40 and a light absorbing unit 50.

The light source 10 is a white light source which may include a small amount of white light emitting diodes (such as five to nine white emitting diodes). Alternatively, the light source 10 may also includes few red light emitting diodes, green light emitting diodes and blue light emitting diodes (such as two red light emitting diodes, two green light emitting diodes and two blue light emitting diodes) from which light is mixed to obtain white light. The light source 10 is located higher than the three color adjusting units 20. The light source 10 projects the white light towards the three color adjusting units 20.

The three color adjusting units 20 includes a first color adjusting unit 21, a second color adjusting unit 22 and a third color adjusting unit 23. The first color adjusting unit 21, the second color adjusting unit 22 and the third color adjusting unit 23 are individually and pivotably mounted on a base 200. Thus, the first color adjusting unit 21, the second color adjusting unit 22 and the third color adjusting unit 23 can be pivoted relative to the light source 10 and the other elements of the traffic lamp 100. Each of the first color adjusting unit 21, the second color adjusting unit 22 and the third color adjusting unit 23 is pivotably connected to the base 200 via a connector 202. When receiving a signal, each connector 202 can drive each of the first color adjusting unit 21, the second color adjusting unit 22 and the third color adjusting unit 23 towards the light source 10, the light diffusion unit 40 or the light absorbing unit 50.

Each of the first color adjusting unit 21, the second color adjusting unit 22 and the third color adjusting unit 23 includes a reflector 211 and a color filter 212 attached on a top face of the reflector 211. In this embodiment, the color filter 212 of the first color adjusting unit 21 is a red filter, the color filter 212 of the second color adjusting unit 22 is a green filter, and the color filter 212 of the third color adjusting unit 23 is a yellow filter. The white light incident on the red color filter 212 will be filtered by the red color filter 212 to red light, which is then reflected by the reflector 211, and further filtered by the red color filter 212 to be emergent out of the first color adjusting unit 21. Thus, the white light is converted by the first color adjusting unit 21 to the red light. Similar to the first color adjusting unit 21, the second color adjusting unit 22 can convert the white light to green light, and the third color adjusting unit 23 can convert the white light to yellow light.

The light absorbing unit 50 is also located higher than the three color adjusting units 20. The light absorbing unit 50 is arranged opposite to the light source 10. In this embodiment, the light absorbing unit 50 is a black screen which can absorb the colored light projecting thereon. The light absorbing unit 50 is used to absorb undesired colored light to thereby prevent disturbance of the undesired colored light from desired colored light.

The light diffusion unit 40 is located above the three color adjusting units 20. The light diffusion unit 40 may include a diffusion lens 42 which can diffuse the colored light projecting thereon uniformly. Thus, the colored light becomes uniform after passing through the light diffusion unit 40.

The panel 30 is located above the light diffusion unit 40. The colored light is projected on the panel 30 to present traffic signal. In this embodiment, the panel 30 is a white board which can show the correct color when the colored light projecting thereon.

In operation, when red light is required to be shown on the panel 30, the connectors 202 of the second color adjusting unit 22 and the third color adjusting unit 23 drive the second color adjusting unit 22 and the third color adjusting unit 23 to rotate to face the light absorbing unit 50. Thus, the green light and the yellow light reflected from the second color adjusting unit 22 and the third color adjusting unit 23 is absorbed by the light absorbing unit 50. The first color adjusting unit 21 is rotated by the connector 202 to face the light diffusion unit 40, so that the red light reflected from the first color adjusting unit 21 passes through the light diffusion unit 40 and is uniformly diffused by the light diffusion unit 40 to project on the panel 30. As a result, the traffic lamp 100 presents red light signal. After the red light lasts for a period on the panel 30, the first color adjusting unit 21 is rotated away from facing the light diffusion unit 40 to an orientation confronting the light absorbing unit 50. The second color adjusting unit 22 is rotated from facing the light absorbing unit 50 to an orientation confronting the light diffusion unit 40. The third color adjusting unit 23 remains facing the light absorbing unit 50. Thus, the red light from the first color adjusting unit 21 and the yellow light from the third color adjusting unit 23 are absorbed, and the green light from the second color adjusting unit 22 is projected on the panel 30. The yellow light may also be shown on the panel 30 similar to the red light and the green light.

Compared with the typical traffic lamp, less LEDs are required to construct the light source 10. Thus, energy consumption of the traffic lamp 100 is lowered, and the operation cost of the traffic lamp 100 is reduced accordingly. Furthermore, heat dissipation problem of the traffic lamp 100 is also resolved since heat generation of less LEDs is limited.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A traffic lamp comprising:
   a white light source;
   a first color adjusting unit and a second color adjusting unit rotatable relative to the white light source, each of the first color adjusting unit and the second color adjusting unit comprising a reflector and a color filter mounted on the reflector, the color filter of the first color adjusting unit having a color different from that of the color filter of the second color adjusting unit; and
   a panel;
   wherein the first color adjusting unit is rotatable relative to the white light source between a first position where light emitted from the white light source is filtered to change color and reflected to project on the panel by the first color adjusting unit, and a second position where light emitted from the white light source is filtered to change color and reflected away from the panel by the first color adjusting unit; and
   wherein the second color adjusting unit is rotatable relative to the white light source between a first orientation where light emitted from the white light source is filtered to change color and reflected to project on the panel by the second color adjusting unit, and a second orientation where light emitted from the white light source is filtered to change color and reflected away from the panel by the second color adjusting unit.

2. The traffic lamp of claim 1 further comprising a base, wherein the first color adjusting unit and the second color adjusting unit are pivotably mounted on the base.

3. The traffic lamp of claim 1 further comprising a light absorbing unit, wherein the light reflected away from the panel by the first color adjusting unit or the second color adjusting unit is projected on the light absorbing unit.

4. The traffic lamp of claim 3, wherein the light absorbing unit comprises a black screen.

5. The traffic lamp of claim 3, wherein the light absorbing unit is located opposite to the white light source.

6. The traffic lamp of claim 1 further comprising a light diffusion unit, wherein the light reflected by the first color adjusting unit or the second color adjusting unit firstly passes through the light diffusion unit and then projects on the panel.

7. The traffic lamp of claim 6, wherein the light diffusion unit comprises a light diffusion lens located between the panel and a combination of the first color adjusting unit and the second color adjusting unit.

8. The traffic lamp of claim 1, wherein the color filter of the first color adjusting unit is a red filter, and the color filter of the second color adjusting unit is a green filter.

9. The traffic lamp of claim 1, wherein the white light source comprises a plurality of white light emitting diodes.

10. The traffic lamp of claim 1, wherein the white light source comprises a plurality of red light emitting diodes, green light emitting diodes and blue light emitting diodes.

11. The traffic lamp of claim 1, wherein when the first color adjusting unit is rotated to the first position, the second color adjusting unit is rotated to the second orientation.

12. The traffic lamp of claim 1, wherein when the first color adjusting unit is rotated to the second position, the second color adjusting unit is rotated to the first orientation.

13. A traffic lamp comprising:
    a white light source;
    a base;
    a first color adjusting unit and a second color adjusting unit pivotably mounted on the base;
    a light absorbing unit; and
    a panel;
    wherein when the first color adjusting unit is rotated to a first position where light emitted from the white light source is filtered to have a first color and reflected to project on the panel by the first color adjusting unit, the second color adjusting unit is rotated to another first position where light emitted from the white light source is filtered to have a second color and reflected to project on the light absorbing unit by the second color adjusting unit;
    wherein when the first color adjusting unit is rotated to a second position where light emitted from the white light source is filtered to have the first color and reflected to project on the light absorbing unit by the first color adjusting unit, the second color adjusting unit is rotated to another second position where light emitted from the white light source is filtered to have the second color and reflected to project on the panel by the second color adjusting unit; and
    wherein the first color is different from the second color.

14. The traffic lamp of claim 13, wherein the light absorbing unit comprises a black screen.

15. The traffic lamp of claim 13, wherein the light absorbing unit is located opposite to the white light source.

16. The traffic lamp of claim 13 further comprising a light diffusion unit between the panel and a combination of the first color adjusting unit and the second color adjusting unit.

17. The traffic lamp of claim 16, wherein the light diffusion unit comprises a light diffusion lens diffusing the light reflected by the first color adjusting unit or the second color adjusting unit before the light projecting on the panel.

18. The traffic lamp of claim 13, wherein each of the first color adjusting unit and the second color adjusting unit comprises a reflector and a color filter attached on the reflector.

19. The traffic lamp of claim 18, wherein the color filter of the first color adjusting unit is a red filter, and the color filter of the second color adjusting unit is a green filter.

* * * * *